(No Model.)
W. H. PATTON.
MOTOR FOR STREET CARS.
No. 374,081. Patented Nov. 29, 1887.
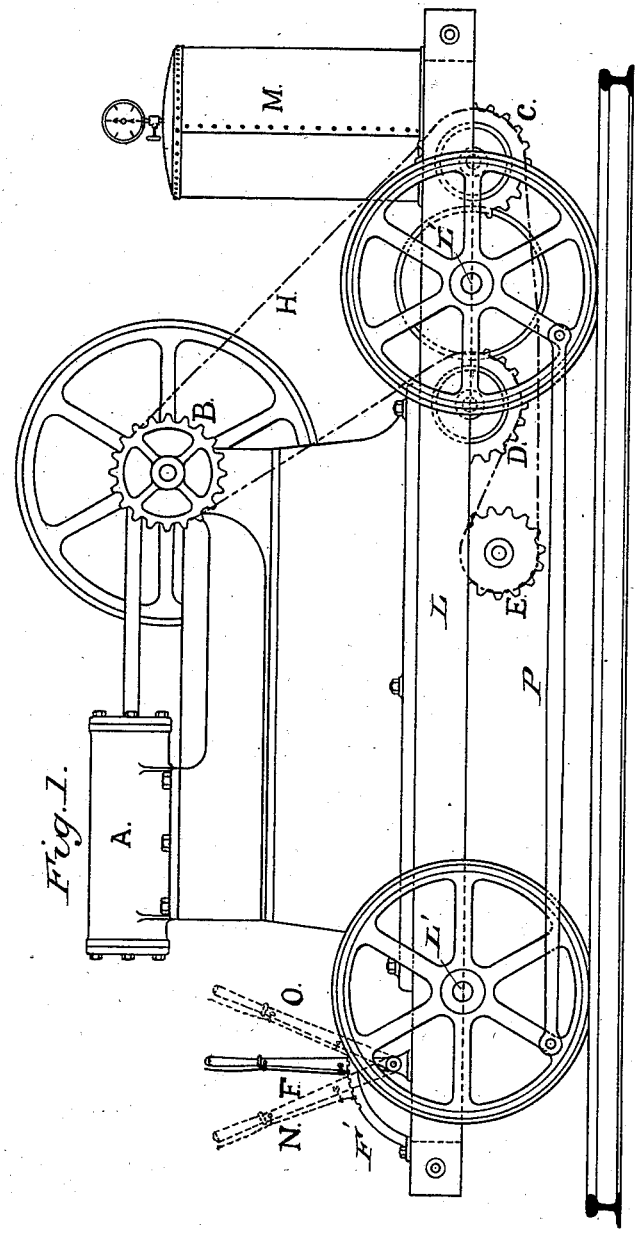
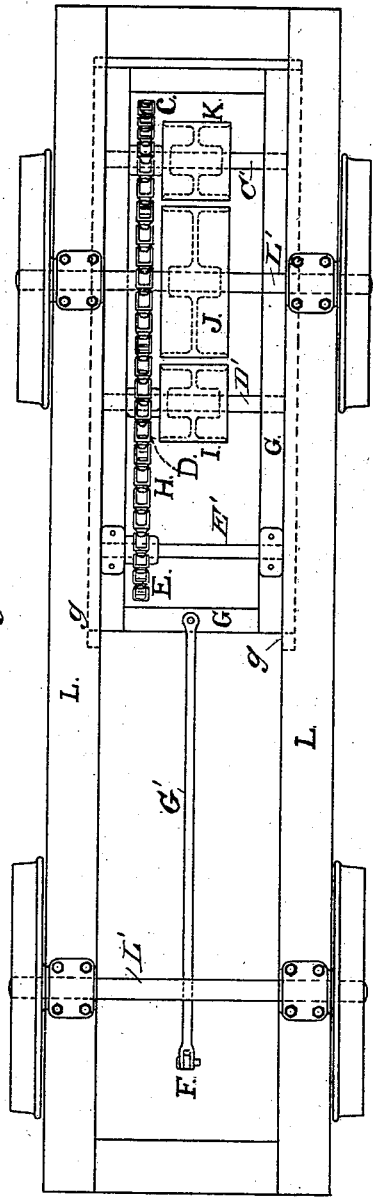
WITNESSES
INVENTOR
Wm H Patton
By Munn & Co
Attorneys.

UNITED STATES PATENT OFFICE.

WILLIAM H. PATTON, OF PUEBLO, COLORADO, ASSIGNOR, BY DIRECT AND MESNE ASSIGNMENTS, TO THE PATTON MOTOR COMPANY, OF SAME PLACE.

MOTOR FOR STREET-CARS.

SPECIFICATION forming part of Letters Patent No. 374,081, dated November 29, 1887.

Application filed May 27, 1887. Serial No. 239,530. (No model.)

*To all whom it may concern:*

Be it known that I, WILLIAM H. PATTON, of Pueblo, in the county of Pueblo and State of Colorado, have invented a new and useful Improvement in Motors, of which the following is a specification.

My invention is an improvement in motors intended especially for use in street-railways; and it consists in certain features of construction and novel combinations of parts whereby the car or locomotive may be moved in one direction or the other, may be reversed, or may be instantly stopped at pleasure.

In the drawings, Figure 1 is a side elevation, and Fig. 2 is a bottom plan view, of my improvement.

To the car-frame L, which constitutes the main frame, are journaled the axles L' L', and on said frame is supported the drive-power A. This drive-power may be a gas-engine, a hot-air or steam engine, an electric motor, or any other approved drive-power without involving a departure from some of the broad features of my invention. It is preferred, however, to employ a gas-engine and to provide a storage-tank, M, in which the gas may be compressed at intervals and supplied as desired to the engine. This form of engine is preferred because of the economy attending its use, and especially for street-vehicles, for the reason that no considerable noise is made thereby to frighten horses, as is the case with steam-engines. The main shaft of this drive-power A has a pulley, B, for the purpose hereinafter described.

The frame L is provided with guides *g* for a frame, G, which may be moved in said guides in the direction of length of the car. This frame extends past one of the axles L' of the car, and in it are journaled three shafts, C', D', and E', on which are secured, respectively, pulleys C, D, and E, the latter being an idler-pulley, as will be seen.

On shafts C' and D', which are arranged on opposite sides of the axle L', I secure friction-pulleys K I, which are movable alternately into engagement with a friction-pulley, J, on the axle L'. In practice these friction-pulleys are revolved in opposite directions, so if one be brought into contact with the axle-pulley it will revolve said axle in reverse direction from that in which it would be revolved by the other pulley. It is preferred to drive these pulleys I and K from the pulley B by means of belt H, the said belt being carried around the idler-pulley E between pulleys C D, in order that said pulleys and the pulleys K I may be driven in reverse directions.

The frame G is connected by a rod, G', with a lever, F, which has a pawl for engaging a rack, F', by which it may be held in any suitable position. When the parts are in the full-line position shown in Figs. 1 and 2, both pulleys I and K are clear of pulley J and the car will remain at a standstill. If the lever F be adjusted to dotted position *o*, Fig. 1, the pulley K will be drawn in contact with pulley J, while if said lever be adjusted to dotted position N the pulley I will be set against pulley J, so the axle may be revolved in one or the other direction.

It is proposed to connect the wheels of the car by means of a pitman, P.

In the use of my invention it will be seen the drive-power may be operated at full speed at all times and its motion may be transmitted to the axles in any desired degree, or so as to revolve the same in either direction.

It will be seen that the waste of power incident to the frequent stopping and starting of the engine is avoided, as the engine may be in operation continually and the motion be transmitted to the vehicle-axles or not, as desired.

While the arrangement and use of the friction-wheels as shown are especially intended for use in street-cars, it is obvious they may be employed for other purposes without departing from my invention.

In starting, the frictions may be so arranged as to slip a little at first, thus avoiding too great a shock in starting and in stopping. If an abrupt stop is desired, the friction-pulleys may be quickly reversed. This will be found effectual in avoiding accident, as the car or other vehicle may be stopped almost instantly.

It will be understood that the friction-pulleys I K may be designated the "drive-frictions" and the pulley J the "axle-friction."

While the belt-gearing arrangement as shown is preferred, it is obvious that I do not desire to limit the broad features of my invention thereto, as the drive-frictions may be revolved in opposite directions by various other arrangements of gearing.

Having thus described my invention, what I claim as new is—

1. The combination, with a main frame, an axle or shaft, and a pulley thereon, of two drive-pulleys journaled adjacent to and movable alternately into engagement with the pulley of the axle or shaft, a drive power, and a single belt connecting the drive-power with both drive-pulleys and disposed over the latter, substantially as described, whereby the said drive-pulleys will be rotated in reverse directions, as and for the purposes specified.

2. The combination of the main frame, the axle or shaft having a pulley thereon, a movable frame supported adjacent to the said axle or shaft, shafts journaled in said frame and having drive-pulleys movable alternately into engagement with the pulley of the axle or shaft, a third shaft, also journaled in the movable frame, belt-pulleys E, D, and C, the drive-power, and the belt H, substantially as and for the purposes specified.

3. In combination with the main frame, the axle or shaft having a friction-pulley, and the sliding frame having a friction pulley or pulleys, the operating-lever, link or rod connecting such lever with the sliding frame, and a detent for securing said lever in its different adjustments, substantially as set forth.

4. The car frame and axle having pulley J, combined with a drive-friction for engaging pulley J, a gas-engine mounted on the framing and geared with the drive-friction, and the storage-tank, also supported on the framing, substantially as set forth.

5. The main frame and axle having a friction-pulley, combined with the sliding frame, the drive-frictions journaled therein on opposite sides of the axle-friction, and mechanism for revolving the drive-frictions in opposite directions, substantially as set forth.

6. The combination of the main frame, the axle having pulley J, the sliding frame having pulleys I and K and E, D, and C, the drive-power, and the belt connecting such drive-power with the pulleys of the sliding frame, and disposed substantially as set forth.

7. The combination of the main frame, the drive-power, the sliding frame, the operating-lever and rod connecting such lever and sliding frame, the axle having friction J, the shafts C', D', and E', the pulleys C, D, and E, the frictions I K, and the belt H, all substantially as set forth.

WILLIAM H. PATTON.

Witnesses:
W. P. GARTLEY,
W. J. KERN.